US012794845B2

(12) United States Patent
Lee

(10) Patent No.: US 12,794,845 B2

(45) Date of Patent: Nov. 10, 2026

(54) METHOD FOR MANAGING MESSAGE TRANSMISSION, CONTROL DEVICE, AND COMPUTER READABLE STORAGE MEDIUM

(71) Applicant: HTC Corporation, Taoyuan City (TW)

(72) Inventor: Kuo-Hsiu Lee, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 107 days.

(21) Appl. No.: 18/755,724

(22) Filed: Jun. 27, 2024

(65) Prior Publication Data

US 2025/0240262 A1 Jul. 24, 2025

Related U.S. Application Data

(60) Provisional application No. 63/622,078, filed on Jan. 18, 2024.

(51) Int. Cl.

*H04L 51/222* (2022.01)

*H04L 65/403* (2022.01)

(52) U.S. Cl.

CPC .......... *H04L 51/222* (2022.05); *H04L 65/403* (2013.01); *A63F 2300/5533* (2013.01)

(58) Field of Classification Search

CPC ... G06F 16/2477; G06F 16/212; H04L 51/04; H04L 65/403; H04L 51/222; H04L 67/131; H04L 67/61; H04W 4/023; A63F 13/358; A63F 2300/534; A63F 2300/5533; A63F 2300/5553; A63F 13/30; A63F 13/45; G06T 13/40; G06T 15/10

See application file for complete search history.

(56) References Cited

U.S. PATENT DOCUMENTS

2005/0181872 A1* 8/2005 Acharya ............... H04L 67/131 463/35

2010/0275136 A1* 10/2010 Gower .................. H04L 65/403 709/204

2018/0027349 A1 1/2018 Osman (Continued)

FOREIGN PATENT DOCUMENTS

TW 200538193 A 12/2005

OTHER PUBLICATIONS

"Search Report of Europe Counterpart Application", issued on Jan. 27, 2025, p. 1-p. 5.

(Continued)

*Primary Examiner* — Rachel J Hackenberg

(74) *Attorney, Agent, or Firm* — JCIPRNET

(57) ABSTRACT

The embodiments of the disclosure provide a method for managing message transmission, a control device, and a computer readable storage medium. The method includes: determining a first zone where a first client device locates among a plurality of predetermined zones; determining a first relative position between the first zone and a second zone among the plurality of predetermined zones; determining a first message transmitting frequency associated with the second zone based on the first relative position; and in response to determining that a second client device locates in the second zone, providing at least a first part of a plurality of first messages from the first client device located in the first zone to the second client device based on the first message transmitting frequency.

16 Claims, 8 Drawing Sheets

(56) References Cited

U.S. PATENT DOCUMENTS

| | | | | |
|---|---|---|---|---|
| 2018/0332139 | A1 | 11/2018 | Gibbon et al. | |
| 2022/0286523 | A1* | 9/2022 | Snyder | G06F 16/212 |
| 2025/0061637 | A1* | 2/2025 | Kapadia | G06T 13/40 |

OTHER PUBLICATIONS

"Office Action of Taiwan counterpart Application", issued on Oct. 27, 2025, p. 1-p. 15.

* cited by examiner

METHOD FOR MANAGING MESSAGE TRANSMISSION, CONTROL DEVICE, AND COMPUTER READABLE STORAGE MEDIUM

CROSS-REFERENCE TO RELATED APPLICATION

This application claims the priority benefit of U.S. provisional application Ser. No. 63/622,078, filed on Jan. 18, 2024. The entirety of the above-mentioned patent application is hereby incorporated by reference herein and made a part of this specification.

BACKGROUND

1. Field of the Invention

The present disclosure generally relates to a mechanism for managing signal transmission, in particular, to a method for managing message transmission, a control device, and a computer readable storage medium.

2. Description of Related Art

In the context of multiplayer applications (e.g., virtual reality (VR) applications), players engage in shared (virtual) environments, necessitating continuous synchronization of their positions and actions. Each player's head-mounted display (HMD) must receive and process pose data from others to ensure seamless experiences.

However, when there are too many players in the same (virtual) environment, each player's HMD may experience performance issues due to the influx of pose data from other players' HMDs.

SUMMARY OF THE INVENTION

Accordingly, the disclosure is directed to a method for managing message transmission, a control device, and a computer readable storage medium, which may be used to solve the above technical problems.

The embodiments of the disclosure provide a method for managing message transmission, applied to a control device. The method includes: determining, by the control device, a first zone where a first client device locates among a plurality of predetermined zones; determining, by the control device, a first relative position between the first zone and a second zone among the plurality of predetermined zones; determining, by the control device, a first message transmitting frequency associated with the second zone based on the first relative position; and in response to determining that a second client device locates in the second zone, providing, by the control device, at least a first part of a plurality of first messages from the first client device located in the first zone to the second client device based on the first message transmitting frequency.

The embodiments of the disclosure provide a control device including a storage circuit and a processor. The storage circuit stores a program code. The processor is coupled to the storage circuit and accesses the program code to perform: determining a first zone where a first client device locates among a plurality of predetermined zones; determining a first relative position between the first zone and a second zone among the plurality of predetermined zones; determining a first message transmitting frequency associated with the second zone based on the first relative position; and in response to determining that a second client device locates in the second zone, providing at least a first part of a plurality of first messages from the first client device located in the first zone to the second client device based on the first message transmitting frequency.

The embodiments of the disclosure provide a non-transitory computer readable storage medium, the computer readable storage medium recording an executable computer program, the executable computer program being loaded by a control device to perform steps of: determining a first zone where a first client device locates among a plurality of predetermined zones; determining a first relative position between the first zone and a second zone among the plurality of predetermined zones; determining a first message transmitting frequency associated with the second zone based on the first relative position; and in response to determining that a second client device locates in the second zone, providing at least a first part of a plurality of first messages from the first client device located in the first zone to the second client device based on the first message transmitting frequency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
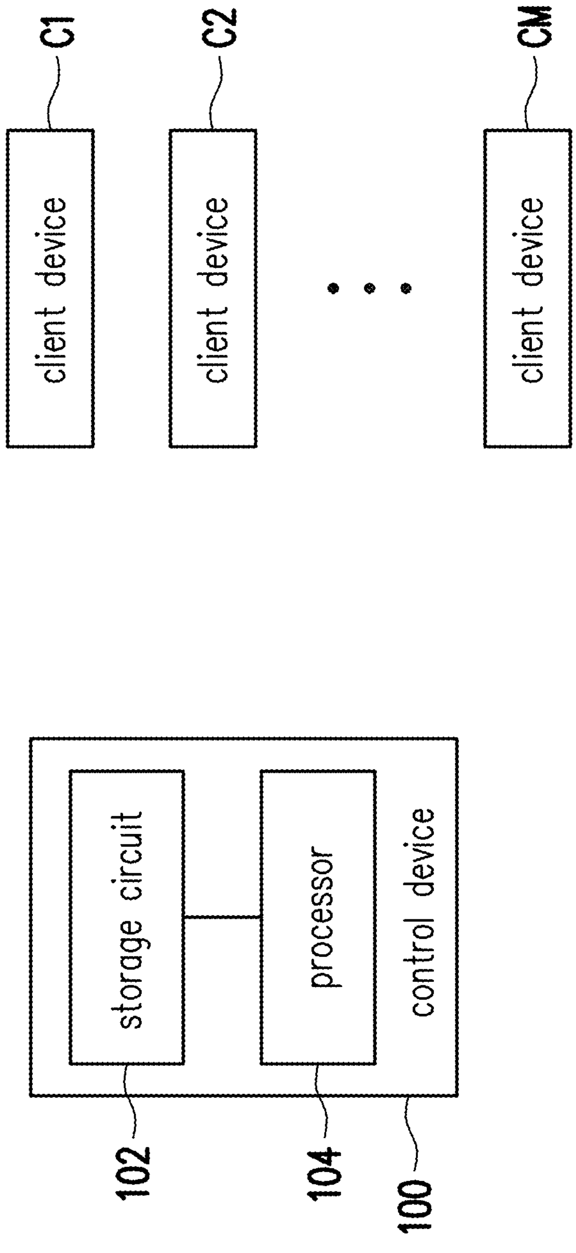
FIG. 1 shows a schematic diagram of a control device and several client devices according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a control device and several client devices according to an embodiment of the disclosure.

In FIG. 1, the control device 100 and/or the client devices C1-CM (M is a positive integer) may be any smart device/computer devices. In the embodiment, the control device 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or a program code that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In some embodiments, the control device 100 may be one or more servers that manage the data exchange of the client devices C1-CM. In the embodiments where multiple server are used to implement the functions of the control device 100, these servers may form a distributed system, but the disclosure is not limited thereto.

In one embodiment, the client devices C1-CM may exchange data through the control device 100. For example, the client device C1 may transmit some data to the control device 100, and the control device 100 may forward at least a part of the data to at least one of the client devices C2-CM, but the disclosure is not limited thereto.

In some embodiments, the control device 100 may perform the above data forwarding by following some predetermined policies. In such cases, when the control device 100 receives, for example, some data (e.g., pose data) from one of the client devices C1-CM, the control device 100 may selectively transmit one or more of the received data to other(s) of the client devices C1-CM.

In one embodiment, the users of the client devices C1-CM may experience the same virtual world of a reality service in the same field, and the client devices C1-CM may be host devices (e.g., HMDs) that provides the corresponding visual contents for the user thereof, but the disclosure is not limited thereto.

In various embodiments, the reality service may be, for example, the augmented reality (AR) service, the VR service, the mixed reality (MR) service and/or the extended reality (ER) service, etc.

For better understanding, the reality service considered in the following discussions would be assumed to be the VR service, but the disclosure is not limited thereto. In this case, each of the client devices C1-CM (e.g., HMDs) may provide the corresponding visual contents for the corresponding user, such that the users of the client devices C1-CM may experience the same VR world in the same field.

Figure 2:
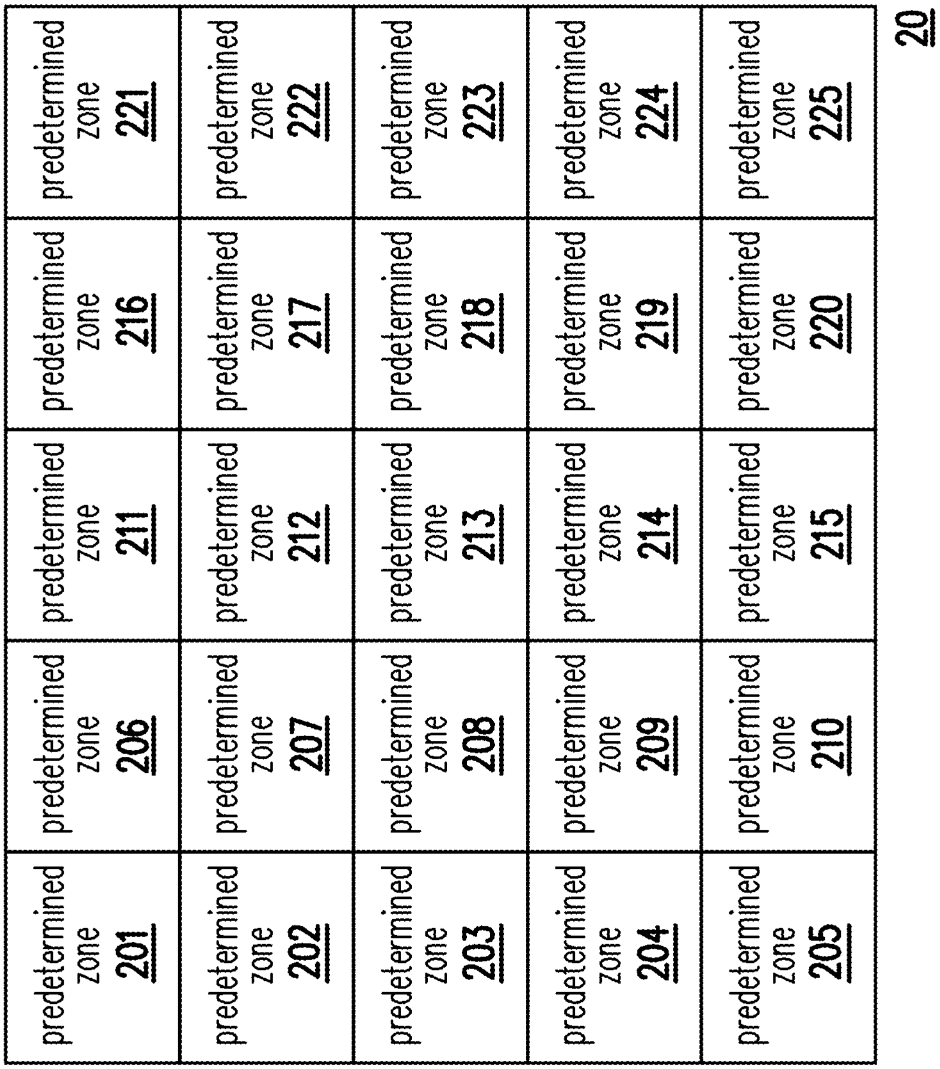
FIG. 2 shows a top view of a field according to an embodiment of the disclosure.

See FIG. 2, which shows a top view of a field according to an embodiment of the disclosure. In FIG. 2, the field 20 may be the place where the client devices C1-CM experience the same virtual world of the reality service.

In the embodiments of the disclosure, the field 20 may be divided into a plurality of predetermined zones. In various embodiments, the shape, size, dimension, position, range, width, length, and/or height of each of the plurality of predetermined zones may be determined based on the requirement of the designer, but the disclosure is not limited thereto.

In FIG. 2, the field 20 may be exemplarily divided into the predetermined zones 201-225, wherein the predetermined zones 201-225 may be arranged as a 5×5 grid, but the disclosure is not limited thereto.

In the embodiment, each of the client devices C1-CM may be moved around within the field 20 along with the corresponding users, and each of the client devices C1-CM may track its own pose by using, for example, the inside-out and/or outside-in tracking mechanisms, but the disclosure is not limited thereto.

In the embodiment, each of the client devices C1-CM may provide the associated tracking result as the corresponding pose data to the control device 100, and the control device 100 may accordingly determine the predetermined zone where each of the client devices C1-CM currently locates.

In the embodiment, since the users in the same field 20 are experiencing the same virtual world, the user of one of the client devices C1-CM may see (the avatars of) the users of others of the client devices C1-CM in the corresponding visual content.

For example, if the user of the client device C1 is facing the user of the client device C2, (the avatar of) the user of the client device C2 may be shown in the visual content shown by the client device C1 to the user thereof, but the disclosure is not limited thereto.

In some embodiments, for properly providing the visual contents, each of the client devices C1-CM may need information associated with other client devices C1-CM. For example, the client device C1 may need the pose data (e.g., the orientation and/or the position) of the client device C2 for accurately render the avatar corresponding to the client device C2 in the visual content shown by the client device C1.

However, when there are numerous client devices C1-CM, each of the client devices C1-CM may receive a plethora of unnecessary information (e.g., the pose data of others of the client devices C1-CM), thereby impacting the performances of the client devices C1-CM.

Accordingly, the embodiments of the disclosure provide a method for managing message transmission, which can be applied to the control device 100 for resolving the above problem.

In the embodiments of the disclosure, the processor 104 may access the modules and/or the program code stored in the storage circuit 102 to implement the method for managing message transmission provided in the disclosure, which would be further discussed in the following.

Figure 3:
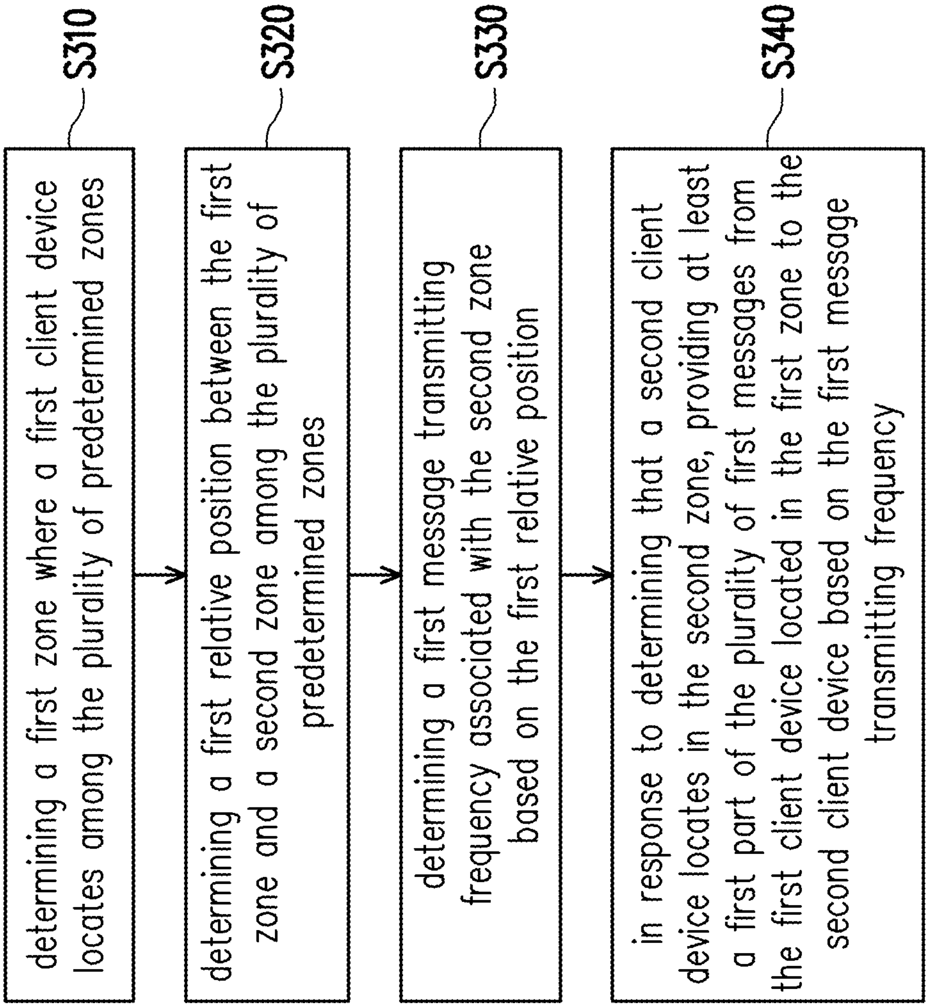
FIG. 3 shows a flow chart of the method for managing message transmission according to an embodiment of the disclosure.
Figure 4:
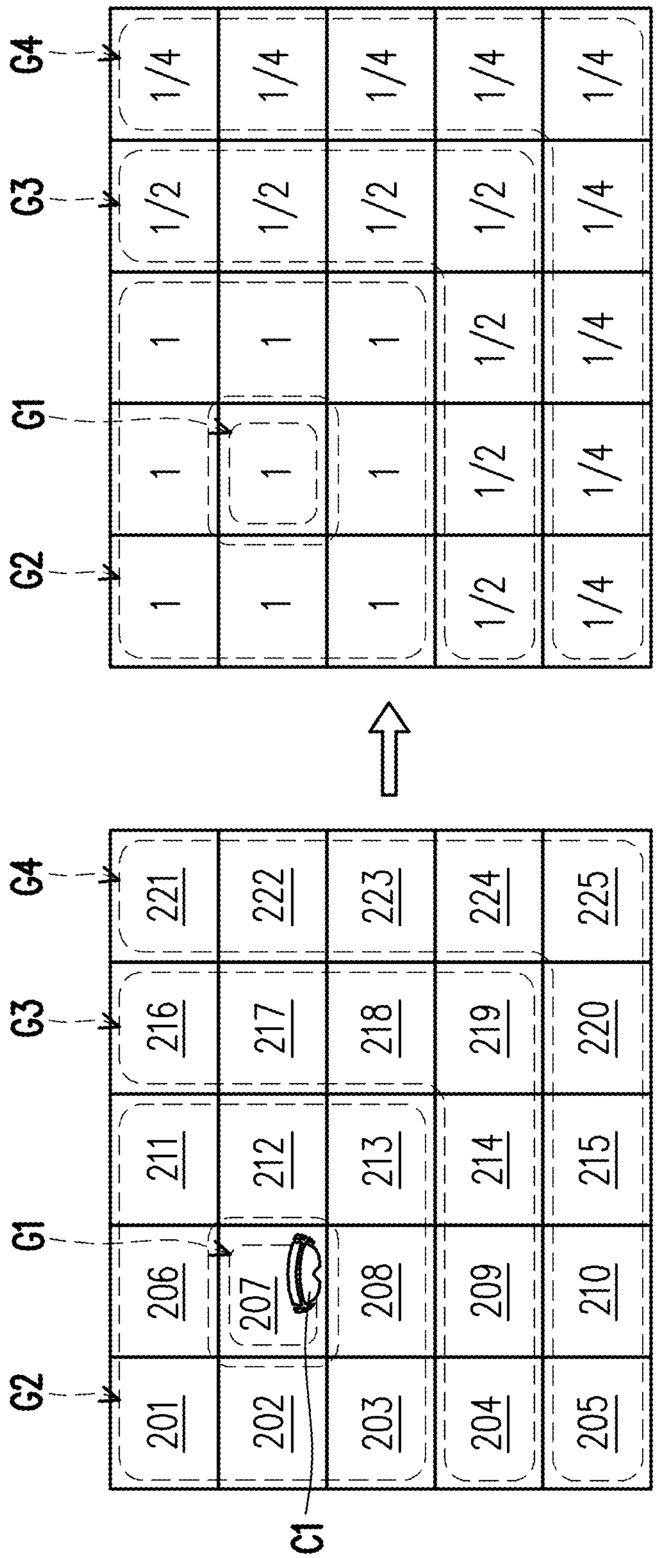
FIG. 4 shows an application scenario according to FIG. 2.

See FIG. 3, which shows a flow chart of the method for managing message transmission according to an embodiment of the disclosure. The method of this embodiment may be executed by the control device 100 in FIG. 1, and the details of each step in FIG. 3 will be described below with the components shown in FIG. 1. In addition, for better understanding the concept of the disclosure, FIG. 4 would be used as an example, wherein FIG. 4 shows an application scenario according to FIG. 2.

Firstly, in step S310, the processor 104 determines a first zone where a first client device locates among the plurality of predetermined zones 201-225.

For better understanding, the client device C1 currently locating in the predetermined zone 207 would be assumed to be the considered first client device in the following discussions, but the disclosure is not limited thereto. In this case, the processor 104 may determine the predetermined zone 207 as the considered first zone in step S310, but the disclosure is not limited thereto.

In this case, the processor 104 may divide the plurality of predetermined zones 201-225 into a plurality of zone groups based on a relative position between the first zone (e.g., the predetermined zone 207) and each of the plurality of predetermined zones.

In one embodiment, in a case where $2 \le i \le N$ (N is the number of the zone groups, and i is an index), the predetermined zones in an i-th zone group among the plurality of zone groups at least partially surround the predetermined zones in an (i−1)-th zone group among the plurality of zone groups, wherein N is a number of the plurality of zone groups. In one embodiment, in a case where i is 1, the i-th zone group comprises the first zone.

In the scenario of FIG. 4, the processor 104 may divide the plurality of predetermined zones 201-225 into the zone groups G1-G4. Specifically, the zone group G1 (e.g., the 1st zone group among the zone groups G1-G4) may include the predetermined zone 207 (e.g., the first zone considered in FIG. 4). The zone group G2 (e.g., the 2nd zone group among the zone groups G1-G4) may include the predetermined zones 201, 202, 203, 208, 213, 212, 211, 206, which are the predetermined zones (partially) surround the predetermined zone 207 in the zone group G1.

The zone group G3 (e.g., the 3rd zone group among the zone groups G1-G4) may include the predetermined zones 216-219, 214, 209, 204, which are the predetermined zones (partially) surround the predetermined zones in the zone group G2. The zone group G4 (e.g., the 4th zone group among the zone groups G1-G4) may include the predetermined zones 221-225, 220, 215, 210, 205, which are the predetermined zones (partially) surround the predetermined zones in the zone group G3, but the disclosure is not limited thereto.

From another perspective, the distance between the first zone and each predetermined zone in the (i−1)-th zone group is smaller than the distance between the first zone and each predetermined zone in the i-th zone group, but the disclosure is not limited thereto.

For example, the distance between the first zone (e.g., the predetermined zone 207) and each predetermined zone in the zone group G2 (e.g., the 2nd zone group) is smaller than the distance between the first zone and each predetermined zone in the zone group G3 (e.g., the 3rd zone group). For another example, the distance between the first zone (e.g., the predetermined zone 207) and each predetermined zone in the zone group G3 (e.g., the 3rd zone group) is smaller than the distance between the first zone and each predetermined zone in the zone group G4 (e.g., the 4th zone group).

In other embodiments, the predetermined zones forming each of the zone groups may be determined based on other ways. For example, the predetermined zones in the same row/column/diagonal may be determined to be in the same zone group, but the disclosure is not limited thereto.

In one embodiment, the processor 104 may assign a message transmitting frequency to each of the plurality of zone groups G1-G4.

In one embodiment, the message transmitting frequency corresponding to each of the zone groups may be non-positively related to the distance between the considered first zone and the predetermined zones in each of the zone groups G1-G4. For example, the message transmitting frequency corresponding to the zone group G2 may be not higher than the message transmitting frequency corresponding to the zone group G1, the message transmitting frequency corresponding to the zone group G3 may be not higher than the message transmitting frequency corresponding to the zone group G2, and the message transmitting frequency corresponding to the zone group G4 may be not higher than the message transmitting frequency corresponding to the zone group G3, but the disclosure is not limited thereto.

In one embodiment, the message transmitting frequency corresponding to each of the zone groups may be determined based on a transmitting frequency vector that including a plurality of frequency elements, wherein the plurality of frequency elements may be monotonically decreasing.

In the embodiment, the processor 104 may determine an i-th element among the plurality of frequency elements of the transmitting frequency vector as the message transmitting frequency of the i-th zone group among the zone groups G1-G4.

In various embodiments, the frequency elements in the transmitting frequency vector may be determined to be any value based on the requirements of the designer. For better understanding, the transmitting frequency vector in FIG. 4 may be assumed to be [1, 1, ½, ¼], but the disclosure is not limited thereto. In other embodiments, the content and/or length of the transmitting frequency vector may be adjusted based on the requirements of the designer, but the disclosure is not limited thereto.

In this case, the processor 104 may determine the 1st element (e.g., 1) among the plurality of frequency elements of the transmitting frequency vector as the message transmitting frequency of the zone group G1 (e.g., the 1st zone group). In addition, the processor 104 may determine the 2nd element (e.g., 1) among the plurality of frequency elements of the transmitting frequency vector as the message transmitting frequency of the zone group G2 (e.g., the 2nd zone group). Likewise, the processor 104 may determine the 3rd element (e.g., ½) among the plurality of frequency elements of the transmitting frequency vector as the message transmitting frequency of the zone group G3 (e.g., the 3rd zone group), and determine the 4th element (e.g., ¼) among the plurality of frequency elements of the transmitting frequency vector as the message transmitting frequency of the zone group G4 (e.g., the 4th zone group). The message transmitting frequency corresponding to each of the zone groups may be exemplarily shown on the right side of FIG. 4, but the disclosure is not limited thereto.

In some embodiments, the length of the transmitting frequency vector may be not smaller than the number of the zone groups, such that each of the zone groups may have a corresponding message transmitting frequency in the transmitting frequency vector. In the embodiments where the length of the transmitting frequency vector is larger than the number of the zone groups, some of the frequency elements in the transmitting frequency vector may be assigned to any zone group (e.g., the scenario in FIG. 6B).

In some embodiments, the length of the transmitting frequency vector may be smaller than the number of the zone groups. In this case, the message transmitting frequency of the zone groups with no corresponding vector elements will be assigned to be the last element of the transmitting frequency vector, but the disclosure is not limited thereto.

In step S320, the processor 104 determines a first relative position between the first zone and a second zone among the plurality of predetermined zones 201-225.

In the embodiment, the second zone may be any of the plurality of predetermined zones 201-225, including the predetermined zone assumed to be the first zone. That is, in the embodiments where the predetermined zone 207 is assumed to be the considered first zone (e.g., the scenario in FIG. 4), the second zone may be any of the plurality of predetermined zones 201-225, including the predetermined zone 207, but the disclosure is not limited thereto.

In step S330, the processor 104 determines a first message transmitting frequency associated with the second zone based on the first relative position.

In one embodiment, the first message transmitting frequency may be non-positively related to the distance between the first zone and the second zone. That is, the first message transmitting frequency may be monotonically decreasing along with the increasing distance between the first zone and the second zone, but the disclosure is not limited thereto.

In one embodiment, in response to determining that the second zone belongs to one of the plurality of zone groups G1-G4, the processor 104 may determine the message transmitting frequency corresponding to the one of the plurality of zone groups G1-G4 as the first message transmitting frequency associated with the second zone.

For example, in a case where the second zone is the predetermined zone 207 belonging to the zone group G1, the processor 104 may determine the message transmitting frequency (e.g., 1) corresponding to the zone group G1 as the first message transmitting frequency associated with the second zone.

In a case where the second zone is, for example, the predetermined zone 211 belonging to the zone group G2, the processor 104 may determine the message transmitting frequency (e.g., 1) corresponding to the zone group G2 as the first message transmitting frequency associated with the second zone.

In a case where the second zone is, for example, the predetermined zone 216 belonging to the zone group G3, the processor 104 may determine the message transmitting frequency (e.g., ½) corresponding to the zone group G3 as the first message transmitting frequency associated with the second zone.

In a case where the second zone is, for example, the predetermined zone 221 belonging to the zone group G4, the processor 104 may determine the message transmitting frequency (e.g., ¼) corresponding to the zone group G4 as the first message transmitting frequency associated with the second zone.

In the embodiments of the disclosure, the control device 100 may receive a plurality of first messages from the first client device (e.g., the client device C1), wherein the plurality of first messages may be the pose data of the first client device detected at different time points, but the disclosure is not limited thereto.

In step S340, in response to determining that a second client device locates in the second zone, the processor 104 provides at least a first part of the plurality of first messages from the first client device located in the first zone to the second client device based on the first message transmitting frequency.

In the embodiments of the disclosure, the second client device may be another client device among the client devices C1-CM other than the first client device. In the embodiments where the client device C1 is assumed to be the first client device, the second client device may be one of the client devices C2-CM, but the disclosure is not limited thereto.

In one embodiment, in response to determining that the first message transmitting frequency is 1/K (K is a positive integer), the processor 104 may transmit one of the plurality of first messages every K of the plurality of first messages.

Figure 5:
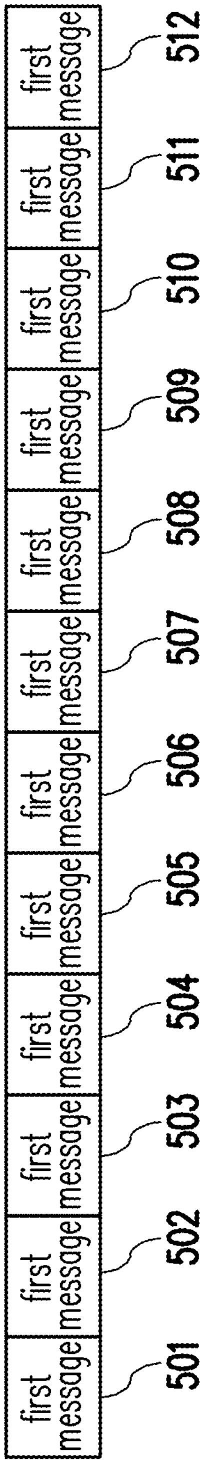
FIG. 5 shows a schematic diagram of providing first messages according to an embodiment of the disclosure.

For better understanding the concept in the above, FIG. 5 would be used as an example, but the disclosure is not limited thereto.

See FIG. 5, which shows a schematic diagram of providing first messages according to an embodiment of the disclosure.

In FIG. 5, the first messages 501-512 may be received by the control device 100 from the first client device (e.g., the client device C1), and the control device 100 may selectively provide (e.g., forward/transmit) at least a part of the first messages 501-512 to the second client device locating in the second zone according to the first message transmitting frequency corresponding to the second zone, and the associated details would be discussed by using the following examples.

In Example 1, if the second zone where the second client device locates is, for example, the predetermined zone 207 belonging to the zone group G1, the processor 104 may determine the first message transmitting frequency to be 1 (i.e., K is 1) in the scenario of FIG. 4.

In this case, the processor 104 may transmit every first message of the first messages 501-512 to the second client device. That is, in the case where the first client device locating in the first zone (e.g., the predetermined zone 207), the processor 104 would forward all of the first messages 501-512 to the second client device locating in the predetermined zone 207 belonging to the zone group G1.

In Example 2, if the second zone where the second client device locates is, for example, the predetermined zones belonging to the zone group G2, the processor 104 may determine the first message transmitting frequency to be 1 (i.e., K is 1) in the scenario of FIG. 4.

In this case, the processor 104 may also transmit every first message of the first messages 501-512 to the second client device. That is, in the case where the first client device locating in the first zone (e.g., the predetermined zone 207), the processor 104 would forward all of the first messages 501-512 to the second client device locating in the predetermined zones belonging to the zone group G2.

In Example 3, if the second zone where the second client device locates is, for example, the predetermined zones belonging to the zone group G3, the processor 104 may determine the first message transmitting frequency to be ½ (i.e., K is 2) in the scenario of FIG. 4.

In this case, the processor 104 may transmit one of the first messages 501-512 every 2 of the first messages 501-512 to the second client device. That is, in the case where the first client device locating in the first zone (e.g., the predetermined zone 207), the processor 104 may transmit the first messages 501, 503, 505, 507, 509, 511 (or the first messages 502, 504, 506, 508, 510, 512) to the second client device locating in the predetermined zones belonging to the zone group G3.

In Example 4, if the second zone where the second client device locates is, for example, the predetermined zones belonging to the zone group G4, the processor 104 may determine the first message transmitting frequency to be ¼ (i.e., K is 4) in the scenario of FIG. 4.

In this case, the processor 104 may transmit one of the first messages 501-512 every 4 of the first messages 501-512 to the second client device. That is, in the case where the first client device locating in the first zone (e.g., the predetermined zone 207), the processor 104 may transmit the first messages 501, 505, 509 to the second client device locating in the predetermined zones belonging to the zone group G4, but the disclosure is not limited thereto.

In the embodiments of the disclosure, the above mechanism can be used to determine which of the first messages 501-512 should be forwarded to other client devices.

For example, in one embodiment, the processor 104 may determine a second relative position between the first zone (e.g., the predetermined zone 207) and a third zone among the plurality of predetermined zones 201-225, and determine a second message transmitting frequency associated with the third zone based on the second relative position.

How the second message transmitting frequency is determined may be referred to the discussions of determining the first message transmitting frequency, which would not be repeated herein.

In the embodiment, in response to determining that a third client device locates in the third zone, the processor 104 may provide at least a second part of the plurality of first messages 501-512 from the first client device located in the first zone to the third client device based on the second message transmitting frequency.

For example, if the third zone where the third client device locates is the predetermined zones belonging to the zone group G3 in the scenario of Example 1, the processor 104 may determine the second message transmitting frequency to be ½ in the scenario of FIG. 4.

In this case, aside from transmitting all of the first messages to the second client device, the processor 104 may transmit one of the first messages 501-512 every 2 of the first messages 501-512 to the third client device. That is, in the case where the first client device locating in the first zone (e.g., the predetermined zone 207), the processor 104 may transmit the first messages 501, 503, 505, 507, 509, 511 (or the first messages 502, 504, 506, 508, 510, 512) to the third client device locating in the predetermined zones belonging to the zone group G3.

For another example, if the third zone where the third client device locates is the predetermined zones belonging to the zone group G4 in the scenario of Example 3, the processor 104 may determine the second message transmitting frequency to be ¼ in the scenario of FIG. 4.

In this case, aside from transmitting every 2 of the first messages 501-512 to the second client device, the processor 104 may transmit one of the first messages 501-512 every 4 of the first messages 501-512 to the third client device. That is, in the case where the first client device locating in the first zone (e.g., the predetermined zone 207), the processor 104 may transmit the first messages 501, 505, 509 to the third client device locating in the predetermined zones belonging to the zone group G4.

Accordingly, the farther away the second client device is from the first client device (e.g., the client device C1), the less frequently the processor 104 will transmit first messages from the first client device to the second client device, which mitigates the burden of the second client device of processing the messages from the first client device (and other client devices). Therefore, the performance of the second client device can be improved. Likewise, the performance of the third client device can be improved as well.

In the embodiments where the first messages include the pose data of the first client device and the second client device only receives a part of the first messages 501-512 (e.g., Example 3 or 4), the second client device may perform a dead reckoning algorithm to compensate for lost positional information, achieving smoother character movement animations, but the disclosure is not limited thereto.

In addition, although the above embodiments are discussed under the assumption where the first client device (e.g., the client device C1) locates in the predetermined zone 207 (i.e., the considered first zone is the predetermined zone 207), the mechanism described in the above would be applicable to the situations where the first client device (e.g., the client device C1) moves to another predetermined zone.

Figure 6A:
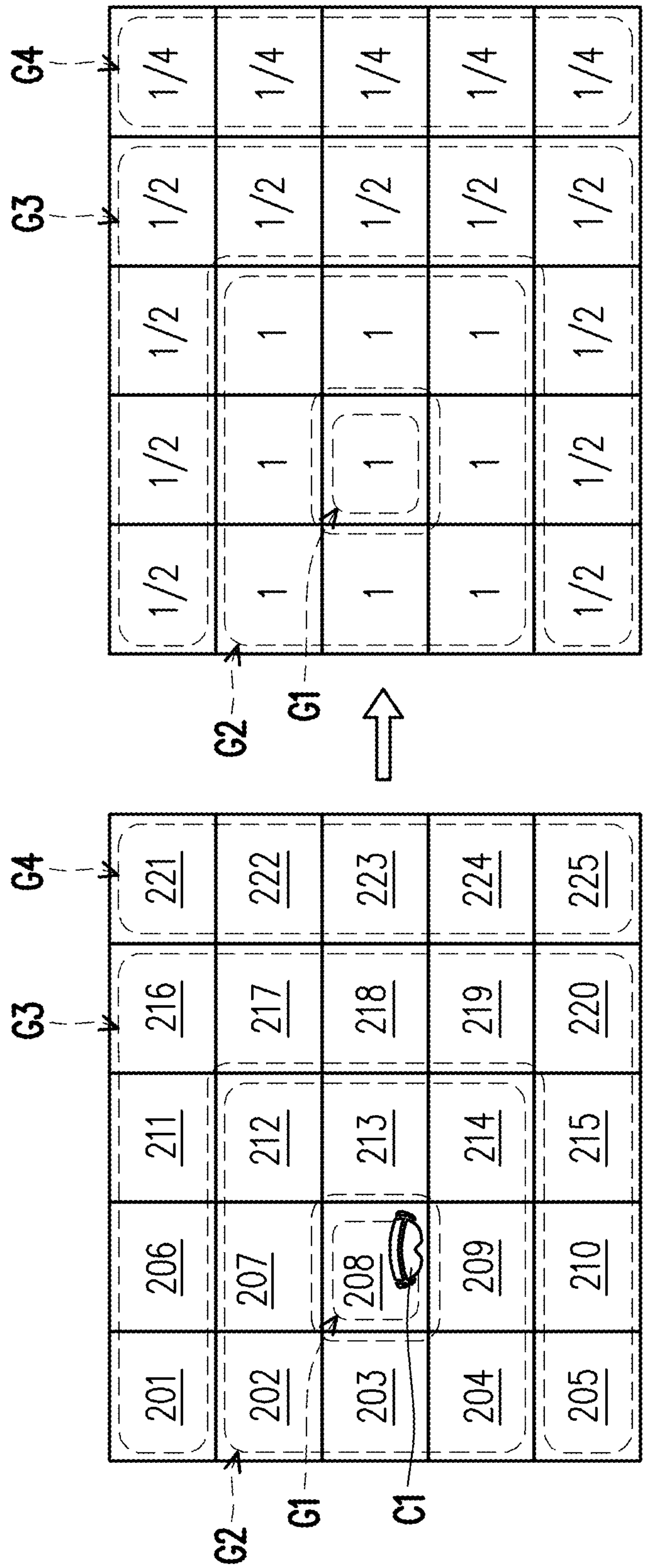
FIG. 6A shows an application scenario according to FIG. 4.

See FIG. 6A, which shows an application scenario according to FIG. 4. In the embodiment, it is assumed that the first zone where the first client device (e.g., the client device C1) locates is (or becomes) the predetermined zone 208.

In this case, the predetermined zones in each of the zone groups G1-G4 and the corresponding message transmitting frequencies would be adaptively adjusted as shown in FIG. 6A.

Figure 6B:
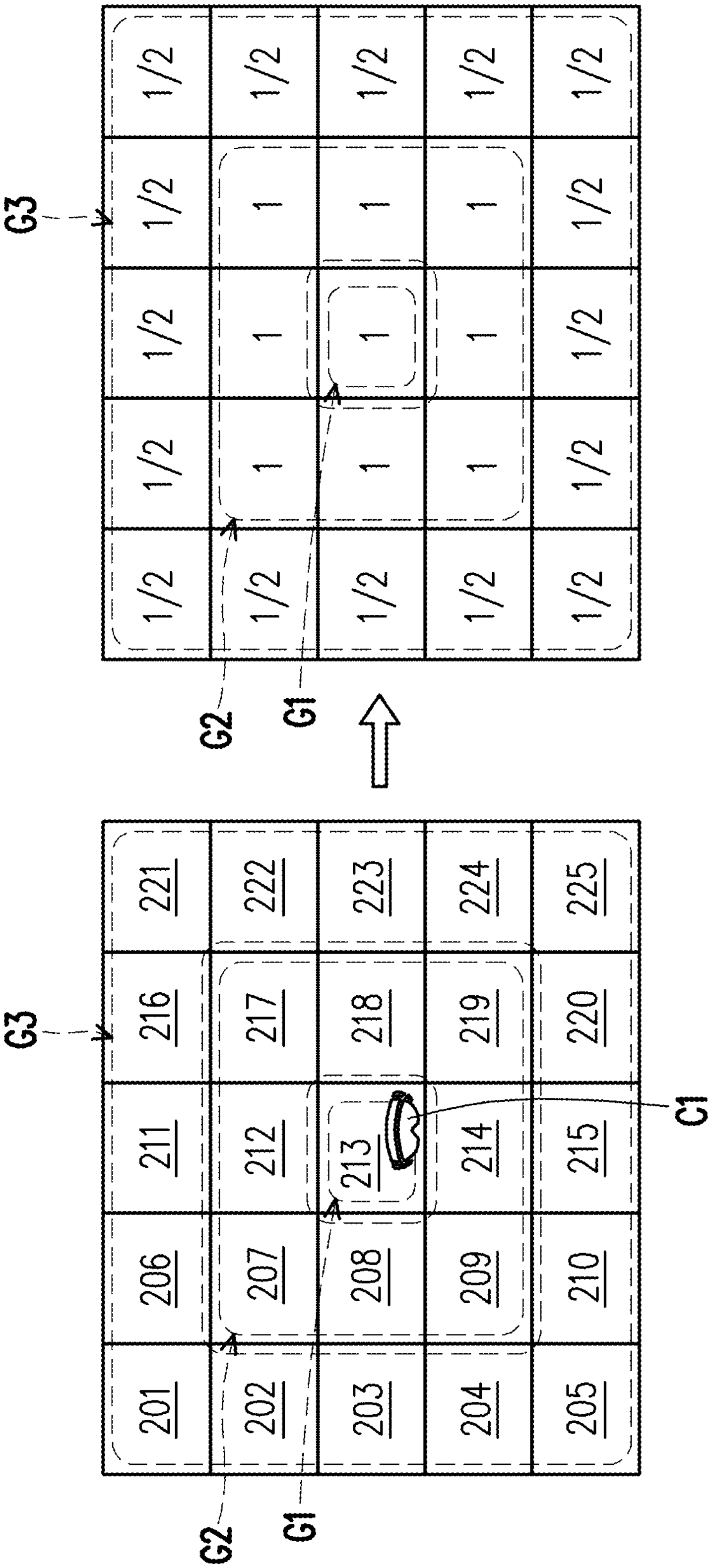
FIG. 6B shows an application scenario according to FIG. 6A.

See FIG. 6B, which shows an application scenario according to FIG. 6A. In the embodiment, it is assumed that the first zone where the first client device (e.g., the client device C1) locates is (or becomes) the predetermined zone 213. In the embodiment, since the number of the zone groups G1-G3 is 3, which is smaller than the length of the considered transmitting frequency vector (e.g., 4), the fourth frequency element (e.g., ¼) in the transmitting frequency vector may not be used to be assigned to any zone group, but the disclosure is not limited thereto.

In this case, the predetermined zones in each of the zone groups G1-G4 and the corresponding message transmitting frequencies would be adaptively adjusted as shown in FIG. 6B.

In one embodiment, before providing at least the first part of the plurality of first messages from the first client device located in the first zone to the second client device based on the first message transmitting frequency, the processor 104 may modify the first message transmitting frequency based on at least one of a loading state of the second client device and a visible range of the second client device in the virtual world.

In a first embodiment, the processor 104 may modify the first message transmitting frequency based on the loading state of the second client device.

In one embodiment, the processor 104 may determine whether the loading state of the second client device indicates that a message receiving loading of the second client device is higher than a loading threshold.

In various embodiments, the loading threshold may be any value enough to be interpreted as heavily loaded, but the disclosure is not limited thereto.

In one embodiment, in response to determining that the loading state of the second client device indicates that the message receiving loading of the second client device is higher than the loading threshold, it means that the second client device may not be able to further receive too many messages, or otherwise the performance thereof may be degraded. In this case, the processor 104 may decrease the first message transmitting frequency, such that the control device 100 may further reduce the first messages forwarded to the second client device, but the disclosure is not limited thereto. In this case, the performance of the second client device may be better guaranteed.

On the other hand, in response to determining that the loading state of the second client device indicates that the message receiving loading of the second client device is not higher than the loading threshold, it means that the second client device may be in light or moderate loading states. In this case, the processor 104 may simply maintain the first message transmitting frequency, but the disclosure is not limited thereto.

In the first embodiment, the processor 104 may determine the loading state of the second client device by the following mechanism.

For example, the processor 104 may obtaining a first number of messages transmitted to the second client device within each of a plurality of first durations (e.g., several consecutive durations) and obtain a second number of processed messages of the second client device within each of the plurality of first durations.

Next, the processor 104 may obtain a plurality of first differences respectively corresponding to the plurality of first durations, wherein a m-th first difference among the plurality of first differences is obtained by subtracting the second number corresponding to a m-th first duration among the plurality of first durations from the first number corresponding to the m-th first duration, wherein m is an index.

In one embodiment, the processor 104 may determine whether the plurality of first differences are higher than a threshold. If yes, it means that the second client device has been unable to completely process the received messages for several consecutive durations. In this case, the processor 104 may determine that the loading state of the second client device indicates that the message receiving loading of the second client device is higher than the loading threshold and accordingly decrease the first message transmitting frequency.

On the other hand, in response to determine that not all of the plurality of first differences are higher than the threshold, it means that the second client device may still be capable of processing the received messages. In this case, the processor 104 may determine that the loading state of the second client device indicates that the message receiving loading of the second client device is not higher than the loading threshold and accordingly maintain the first message transmitting frequency, but the disclosure is not limited thereto.

In the first embodiment, after decreasing the first message transmitting frequency, the processor 104 may further obtain a third number of messages transmitted to the second client device within each of a plurality of second durations (e.g., other several consecutive durations after the first durations), and obtain a fourth number of processed messages of the second client device within each of the plurality of second durations.

Next, the processor 104 may obtain a plurality of second differences respectively corresponding to the plurality of second durations, wherein a n-th second difference among the plurality of second differences is obtained by subtracting the fourth number corresponding to a n-th second duration among the plurality of second durations from the third number corresponding to the n-th second duration, wherein n is an index.

In one embodiment, the processor 104 may determine whether the plurality of second differences are not higher than the threshold. If yes, it means that the second client device has become able to completely process the received messages for several consecutive durations. In this case, the processor 104 may recover the first message transmitting frequency. For example, the processor 104 may recover the decreased first message transmitting frequency to be the first message transmitting frequency determined in step S330, but the disclosure is not limited thereto.

On the other hand, in response to determining that not all of the plurality of second differences are higher than the threshold, it means that the second client device may be still busy, and hence the processor 104 may not recover the decreased first message transmitting frequency, but the disclosure is not limited thereto.

In a second embodiment, the processor 104 may modify the first message transmitting frequency based on the visible range of the second client device in the virtual/real world. For better understanding, FIG. 7 would be used as an example, but the disclosure is not limited thereto.

Figure 7:
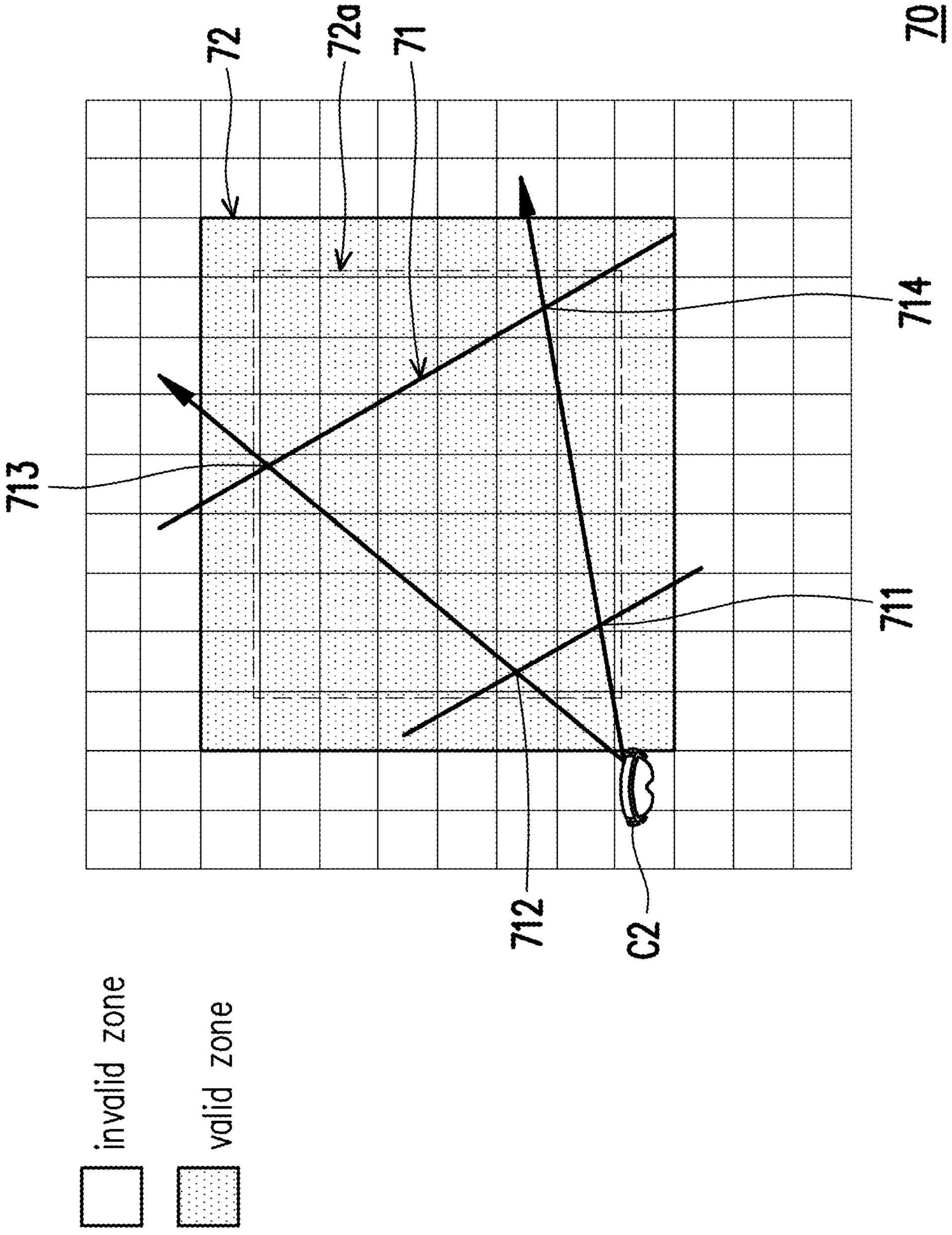
FIG. 7 shows a schematic diagram of determining valid/invalid zones according to an embodiment of the disclosure.

See FIG. 7, which shows a schematic diagram of determining valid/invalid zones according to an embodiment of the disclosure.

In FIG. 7, it is assumed that the second client device is the client device C2, and the field 70 where the second client device locate is divided into the predetermined zones arranged as a 13×13 grid, but the disclosure is not limited thereto.

In addition, it is assumed that the second client device has a visible range 71 in the virtual world, wherein the visible range 71 may be shown, for example, as a trapezoid having four vertices 711-714, but the disclosure is not limited thereto.

That is, the client devices locating in the predetermined zones within the visible range 71 would be seen by the user of the client device C2 in the visual content provided by the client device C2. From another perspective, the visible range 71 may be understood as corresponding to the field of view (FOV) of the front camera of the client device C2, but the disclosure is not limited thereto.

In FIG. 7, the trapezoid corresponding to the visible range 71 may have four sides, wherein the two sides with arrows may correspond to the FOV of the client device C2, and the two sides without arrows may respectively corresponds to the maximum and minimum visible distances of the client device C2, but the disclosure is not limited thereto.

In this case, the processor 104 may determine a plurality of valid zones and a plurality of invalid zones among the plurality of predetermined zones based on the visible range 71 of the second client device in the virtual world.

In one embodiment, the valid zones may be the predetermined zones collectively forming a range 72 not smaller than the visible range 71 and covering the visible range 71.

In FIG. 7, the processor 104 may determine the range 72 based on the vertices 711-714. Specifically, the processor 104 may find the minimum x-coordinate, maximum x-coordinate, minimum y-coordinate, and maximum y-coordinate among the vertices 711-714 and accordingly determine a range 72*a*, wherein the range 72*a* may be a rectangle range covering all of the predetermined zones where the vertices 711-714 locate, but the disclosure is not limited thereto.

After determining the range 72*a*, the processor 104 may further extend the range 72 outwardly by, for example, one predetermined zone to determine the range 72. In this case, the predetermined zones within the range 72 may be regarded as the valid zones, and the predetermined zones outside of the range 72 may be regarded as the invalid zones, but the disclosure is not limited thereto.

Next, the processor 104 may determine whether the first zone where the first client device locates belongs to the invalid zones. If yes, it means that the first client device in the first zone is less likely to be captured by the second client device (e.g., the client device C2), and hence the pose data of the first client device may be unnecessary to the second client device. In this case, the processor 104 may further decrease the first message transmitting frequency, such that the control device 100 may transmit the first messages of the first client device to the second client device less frequently.

In one embodiment, the processor 104 may decrease the first message transmitting frequency to be zero, such that the control device 100 transmit none of the first messages to the second client device in the scenario of FIG. 7, but the disclosure is not limited thereto.

On the other hand, in response to determining that the first zone belongs to the valid zones, it means that it is possible for the first client device to be captured by the second client device. In this case, the processor 104 may maintain the first message transmitting frequency, such that the control device 100 may transmit at least a part of the first messages to the second client device for the second client device to accordingly render the visual content provided to the corresponding user, but the disclosure is not limited thereto.

In one embodiment, the first and second embodiment may be combined into a third embodiment for modifying the first message transmitting frequency, and the associated details may be referred to the above discussions, which would not be repeated herein.

The disclosure further provides a computer readable storage medium for executing the method for managing message transmission. The computer readable storage medium is composed of a plurality of program instructions (for example, a setting program instruction and a deployment program instruction) embodied therein. These program instructions can be loaded into the control device 100 and executed by the same to execute the method for managing message transmission and the functions of the control device 100 described above.

In summary, the embodiments of the disclosure provide a solution to determine the first message transmitting frequency of the second zone in a case where the first client device locating in the first zone based on the first relative position between the first zone and the second zone, and accordingly managing the message transmissions to the second client device. Accordingly, the farther away the second client device is from the first client device, the less frequently the control device will transmit first messages from the first client device to the second client device, which mitigates the burden of the second client device of processing the messages from the first client device (and other client devices). Therefore, the performance of the second client device can be improved.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. Method for managing message transmission, applied to a control device, comprising:

determining, by the control device, a first zone where a first client device is located among a plurality of predetermined zones;

dividing, by the control device, the plurality of predetermined zones into a plurality of zone groups based on a relative position between the first zone and each of the plurality of predetermined zones;

in a case where $2 \leq i \leq N$, the predetermined zones in an i-th zone group among the plurality of zone groups at least partially surround the predetermined zones in an (i−1)-th zone group among the plurality of zone groups, wherein N is a number of the plurality of zone groups;

in a case where i is 1, the i-th zone group comprises the first zone, wherein i is an index;

assigning, by the control device, a message transmitting frequency to each of the plurality of zone groups;

determining, by the control device, a first relative position between the first zone and a second zone among the plurality of predetermined zones;

determining, by the control device, a first message transmitting frequency associated with the second zone based on the first relative position;

modifying the first message transmitting frequency based at least on one of a loading state and a visible range of a second client device;

determining that the second client device is located in the second zone; and in response to determining that the second client device is located in the second zone, providing, by the control device, at least a first part of a plurality of first messages from the first client device located in the first zone to the second client device based on the first message transmitting frequency.

2. The method according to claim 1, wherein determining the first message transmitting frequency associated with the second zone based on the first relative position comprises:

in response to determining that the second zone belongs to one of the plurality of zone groups, determining the message transmitting frequency corresponding to the one of the plurality of zone groups as the first message transmitting frequency associated with the second zone.

3. The method according to claim 1, wherein assigning the message transmitting frequency to each of the plurality of zone groups comprising:

determining an i-th element among a plurality of frequency elements of a transmitting frequency vector as the message transmitting frequency of an i-th zone group among the plurality of zone groups, wherein the plurality of frequency elements are monotonically decreasing, wherein i is an index.

4. The method according to claim 1, further comprising:

receiving the plurality of first messages from the first client device.

5. The method according to claim 1, wherein providing at least the first part of the plurality of first messages from the first client device to the second client device based on the first message transmitting frequency comprising:

in response to determining that the first message transmitting frequency is 1/K, transmitting one of the plurality of first messages every K of the plurality of first messages, wherein K is a positive integer.

6. The method according to claim 1, further comprising:

determining, by the control device, a second relative position between the first zone and a third zone among the plurality of predetermined zones;

determining, by the control device, a second message transmitting frequency associated with the third zone based on the second relative position; and in response to determining that a third client device is located in the third zone, providing at least a second part of the plurality of first messages from the first client device located in the first zone to the third client device based on the second message transmitting frequency.

7. The method according to claim 1, wherein modifying the first message transmitting frequency based on the loading state of the second client device comprising:

in response to determining that the loading state of the second client device indicates that a message receiving loading of the second client device is higher than a loading threshold, decreasing the first message transmitting frequency; and in response to determining that the loading state of the second client device indicates that the message receiving loading of the second client device is not higher than the loading threshold, maintaining the first message transmitting frequency.

8. The method according to claim 7, further comprising:

obtaining a first number of messages transmitted to the second client device within each of a plurality of first durations;

obtaining a second number of processed messages of the second client device within each of the plurality of first durations;

obtaining a plurality of first differences respectively corresponding to the plurality of first durations, wherein a m-th first difference among the plurality of first differences is obtained by subtracting the second number corresponding to a m-th first duration among the plurality of first durations from the first number corresponding to the m-th first duration, wherein m is an index; and in response to determining that the plurality of first differences are higher than a threshold, determining that the loading state of the second client device indicates that the message receiving loading of the second client device is higher than the loading threshold and accordingly decreasing the first message transmitting frequency.

9. The method according to claim 8, wherein after decreasing the first message transmitting frequency, the method further comprises:

obtaining a third number of messages transmitted to the second client device within each of a plurality of second durations;

obtaining a fourth number of processed messages of the second client device within each of the plurality of second durations;

obtaining a plurality of second differences respectively corresponding to the plurality of second durations, wherein a n-th second difference among the plurality of second differences is obtained by subtracting the fourth number corresponding to a n-th second duration among the plurality of second durations from the third number corresponding to the n-th second duration, wherein n is an index; and in response to determining that the plurality of second differences are not higher than the threshold, recovering the first message transmitting frequency.

10. The method according to claim 1, wherein modifying the first message transmitting frequency based on the visible range of the second client device in comprises:

determining a plurality of valid zones and a plurality of invalid zones among the plurality of predetermined zones based on the visible range of the second client device;

in response to determining that the first zone belongs to the plurality of invalid zones, decreasing the first message transmitting frequency.

11. The method according to claim 10, wherein decreasing the first message transmitting frequency comprises decreasing the first message transmitting frequency to be zero.

12. The method according to claim 10, further comprising:

in response to determining that the first zone belongs to the plurality of valid zones, maintaining the first message transmitting frequency.

13. A control device, comprising:

a non-transitory storage circuit, storing a program code; and a processor, coupled to the non-transitory storage circuit and accessing the program code to perform:

determining a first zone where a first client device is located among a plurality of predetermined zones;

dividing the plurality of predetermined zones into a plurality of zone groups based on a relative position between the first zone and each of the plurality of predetermined zones;

in a case where 2≤i≤N, the predetermined zones in an i-th zone group among the plurality of zone groups at least partially surround the predetermined zones in an (i−1)-th zone group among the plurality of zone groups, wherein N is a number of the plurality of zone groups;

in a case where i is 1, the i-th zone group comprises the first zone, wherein i is an index;

assigning a message transmitting frequency to each of the plurality of zone groups;

determining a first relative position between the first zone and a second zone among the plurality of predetermined zones;

determining a first message transmitting frequency associated with the second zone based on the first relative position;

modifying the first message transmitting frequency based at least on one of a loading state and a visible range of a second client device;

determining that the second client device is located in the second zone; and in response to determining that the second client device is located in the second zone, providing at least a first part of a plurality of first messages from the first client device located in the first zone to the second client device based on the first message transmitting frequency.

14. The control device according to claim 13, wherein the processor performs:

in response to determining that the second zone belongs to one of the plurality of zone groups, determining the message transmitting frequency corresponding to the one of the plurality of zone groups as the first message transmitting frequency associated with the second zone.

15. The control device according to claim 13, wherein before providing at least the first part of the plurality of first messages from the first client device located in the first zone to the second client device based on the first message transmitting frequency, the processor further performs:

modifying the first message transmitting frequency based on a visible range of the first client device in a virtual world.

16. A non-transitory computer readable storage medium, the computer readable storage medium recording an executable computer program, the executable computer program being loaded by a control device to perform steps of:

determining a first zone where a first client device is located among a plurality of predetermined zones;

dividing the plurality of predetermined zones into a plurality of zone groups based on a relative position between the first zone and each of the plurality of predetermined zones;

in a case where 2≤i≤N, the predetermined zones in an i-th zone group among the plurality of zone groups at least partially surround the predetermined zones in an (i−1)-th zone group among the plurality of zone groups, wherein N is a number of the plurality of zone groups;

in a case where i is 1, the i-th zone group comprises the first zone, wherein i is an index;

assigning a message transmitting frequency to each of the plurality of zone groups;

determining a first relative position between the first zone and a second zone among the plurality of predetermined zones;

determining a first message transmitting frequency associated with the second zone based on the first relative position;

modifying the first message transmitting frequency based at least on one of a loading state and a visible range of a second client device;

determining that the second client device is located in the second zone; and in response to determining that the second client device is located in the second zone, providing at least a first part of a plurality of first messages from the first client device located in the first zone to the second client device based on the first message transmitting frequency.

* * * * *